United States Patent
Tsuchiya et al.

(10) Patent No.: US 7,224,524 B2
(45) Date of Patent: May 29, 2007

(54) TOTAL REFLECTION FLUORESCENT MICROSCOPE

(75) Inventors: Atsuhiro Tsuchiya, Hachioji (JP); Kenichi Kusaka, Akiruno (JP); Yasushi Aono, Yokohama (JP)

(73) Assignee: Olympus Corporation, Tokyo (JP)

( * ) Notice: Subject to any disclaimer, the term of this patent is extended or adjusted under 35 U.S.C. 154(b) by 190 days.

(21) Appl. No.: 10/848,626

(22) Filed: May 18, 2004

(65) Prior Publication Data

US 2004/0246573 A1 Dec. 9, 2004

(30) Foreign Application Priority Data

May 21, 2003 (JP) .............................. 2003-143382

(51) Int. Cl.
*G02B 21/06* (2006.01)
*G02B 21/00* (2006.01)

(52) U.S. Cl. ..................... 359/387; 359/368; 359/385

(58) Field of Classification Search ........ 359/368–390, 359/738–740, 232–236; 356/375
See application file for complete search history.

(56) References Cited

U.S. PATENT DOCUMENTS 4,852,985 A * 8/1989 Fujihara et al. ............. 359/387
4,854,657 A * 8/1989 Scott .......................... 359/617
5,257,093 A * 10/1993 Mager et al. ................ 356/625
5,726,740 A * 3/1998 Shiozawa et al. ............. 355/67
6,597,499 B2* 7/2003 Kawano et al. ............. 359/387

FOREIGN PATENT DOCUMENTS

| JP | 2002-169097 | | 6/2002 | |
|----|----|----|----|----|
| JP | 2002-236258 | | 8/2002 | |
| JP | 2003-29153 | * | 1/2003 | ................. 359/385 |
| JP | 2003-114388 | * | 4/2003 | ................. 359/385 |
| JP | 2003-279860 | * | 10/2003 | ................. 359/385 |
| JP | 2004-302421 | * | 10/2004 | ................. 359/385 |

OTHER PUBLICATIONS

English translation of the japanese reference No. 2003-29153.*

* cited by examiner

*Primary Examiner*—Thong Q. Nguyen
(74) *Attorney, Agent, or Firm*—Frishauf, Holtz, Goodman & Chick, P.C.

(57) ABSTRACT

A fluorescent microscope comprises a light source, an optical illumination system which forms an optical path to irradiate a specimen with a light beam from the light source, an objective lens which condenses the light beam of the optical illumination system onto the specimen, an optical device which is disposed on the optical path of the optical illumination system and which decenters the light beam by decentering an optical axis of the optical path, and a slit which passes the light beam decentered by the optical device through a total reflection illumination region on an emission pupil surface of the objective lens.

15 Claims, 10 Drawing Sheets

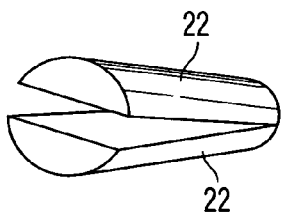
FIG. 6
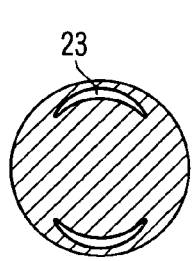 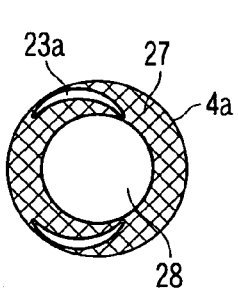 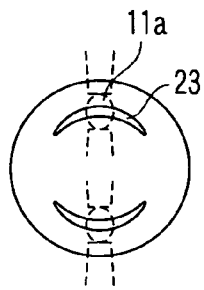 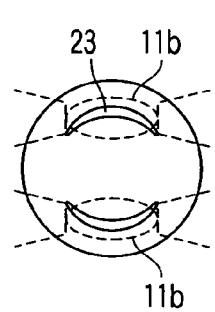
FIG. 7A  FIG. 7B  FIG. 7C  FIG. 7D
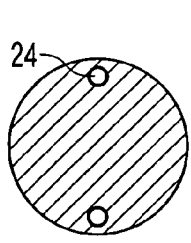 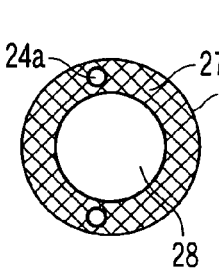 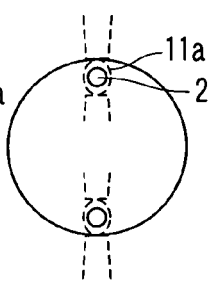  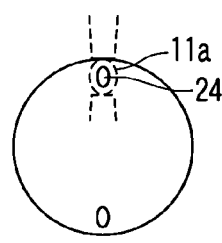
FIG. 8A  FIG. 8B  FIG. 8C  FIG. 8D  FIG. 8E
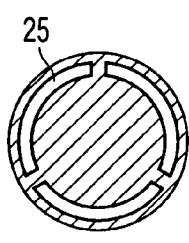 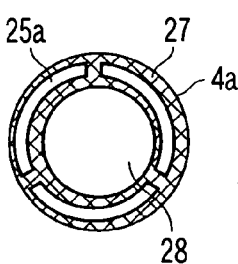 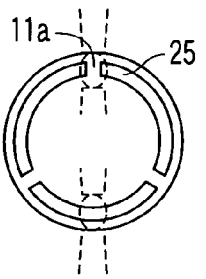 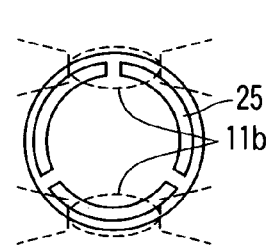
FIG. 9A  FIG. 9B  FIG. 9C  FIG. 9D

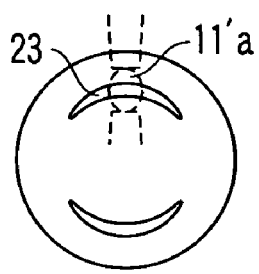 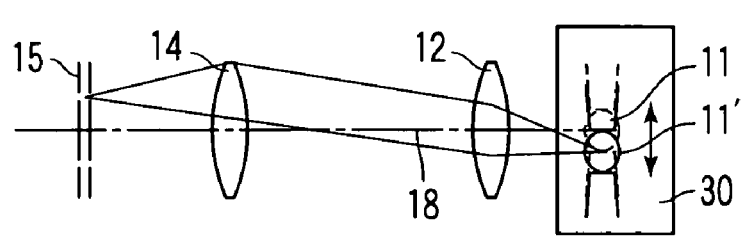
FIG. 10B  FIG. 10A
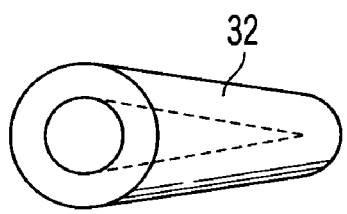
FIG. 12
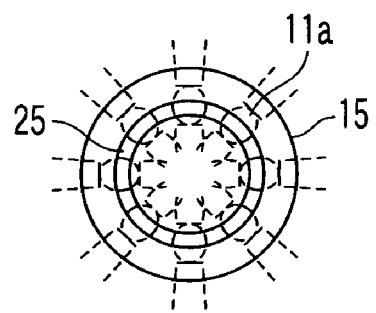
FIG. 13

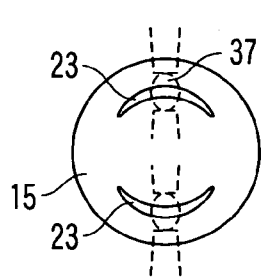
F I G. 19A
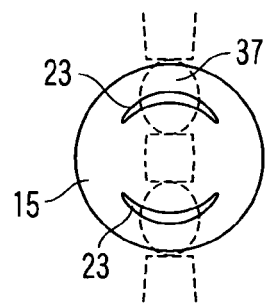
F I G. 19B
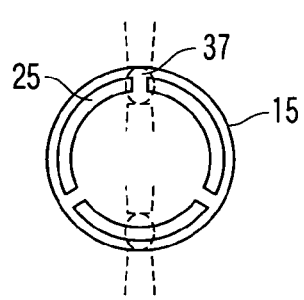
F I G. 20A
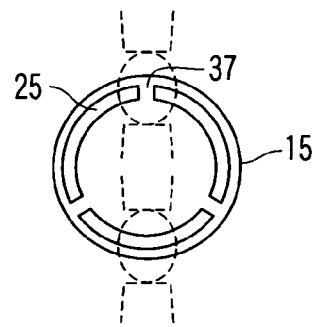
F I G. 20B
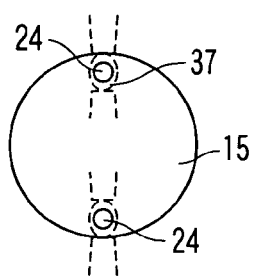
F I G. 21
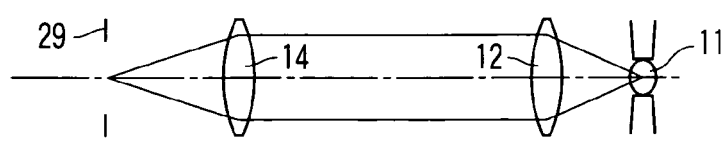
F I G. 22

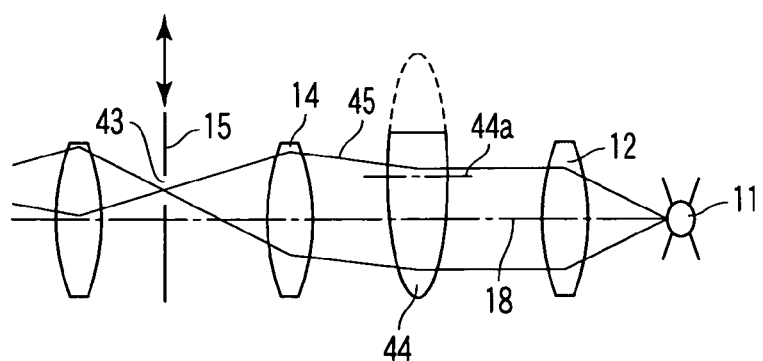
F I G. 23
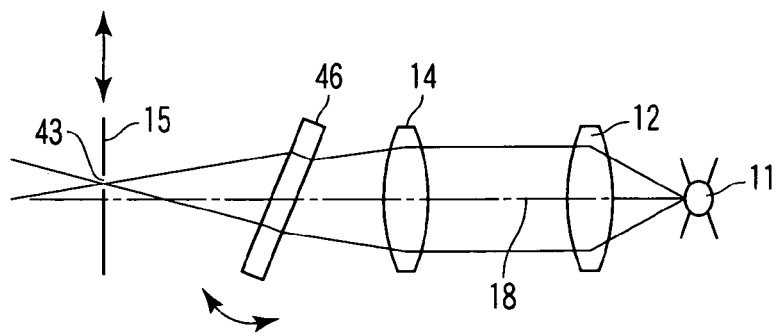
F I G. 24
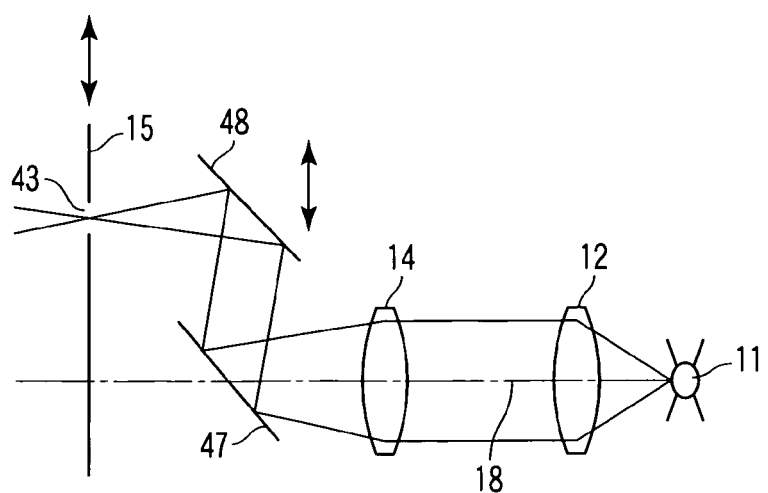
F I G. 25

ND REFLECTION FLUORESCENT
TOTAL REFLECTION FLUORESCENT MICROSCOPE

CROSS-REFERENCE TO RELATED APPLICATIONS

This application is based upon and claims the benefit of priority from prior Japanese Patent Application No. 2003-143382, filed May 21, 2003, the entire contents of which are incorporated herein by reference.

BACKGROUND OF THE INVENTION

1. Field of the Invention

The present invention relates to a total reflection fluorescent microscope, which can perform fluorescent observation by total reflection illumination.

2. Description of the Related Art

In recent years, functions of biological cells have been vigorously analyzed. In the function analysis of the cells, attentions have been paid especially to a total reflection fluorescent microscope which acquires a total reflection fluorescent image from a cell membrane and its vicinity as a device for observing the function of the cell membrane.

Total reflection illumination which locally illuminates only a sample in the vicinity of a glass surface is used in the total reflection fluorescent microscope. In the total reflection illumination, an evanescent light is used which oozes to a sample side by about several hundreds of nanometers in a boundary surface between glass and sample, and a background noise (scattered light and the like) is remarkably low. Therefore, fluorescent observation of even a molecular of fluorescent dyestuff is possible by the total reflection fluorescent microscope.

Additionally, in general, in the total reflection fluorescent microscope, a laser light beam is used as a light source. A total reflection fluorescent microscope in which the laser light beam is introduced into an optical illumination system of the microscope via a glass fiber is described, for example, in Jpn. Pat. Appln. KOKAI Publication No. 2002-169097.

However, the laser light source which produces the laser light beam is expensive, and additionally a monochromatic light is produced. Therefore, for example, in order to cope with fluorescent reagents having various excitation wavelength characteristics, a plurality of laser light sources have to be prepared. Therefore, the total reflection fluorescent microscope becomes further expensive, and additionally a large occupying space is also required for installing a plurality of laser light sources.

To solve the problem, as described in Jpn. Pat. Appln. KOKAI Publication No. 2002-236258, a total reflection fluorescent microscope has been proposed in which inexpensive white light sources such as a mercury lamp and a xenon lamp are used instead of the laser light source. The total reflection fluorescent microscope according to the Jpn. Pat. Appln. KOKAI Publication No. 2002-236258 is configured as follows. A ring slit for transmitting a light beam in an annular form is disposed in the optical illumination system disposed on an optical path of the light emitted from the white laser light beam. Moreover, when an image of the ring slit is projected onto an emission pupil surface of an objective lens, an illuminative light is guided only to an orbicular total reflection region around an emission pupil of the objective lens. Moreover, total reflection is performed in a boundary surface between a specimen and cover glass to produce the evanescent light, and a fluorescent dyestuff is excited.

BRIEF SUMMARY OF THE INVENTION

A fluorescence microscope according to a first aspect of the present invention is characterized by comprising a light source; an optical illumination system which forms an optical path to irradiate a specimen with a light beam from the light source; an objective lens which condenses the light beam of the optical illumination system onto the specimen; an optical device which is disposed on the optical path of the optical illumination system and which decenters the light beam by decentering an optical axis of the optical path; and a slit which passes the light beam decentered by the optical device through a total reflection illumination region on an emission pupil surface of the objective lens.

A fluorescence microscope according to a second aspect of the present invention is characterized by comprising: a light source; an optical illumination system which forms an optical path to irradiate a specimen with a light beam from the light source; an objective lens which condenses the light beam of the optical illumination system onto the specimen; and a slit which passes the light beam from the light source through a total reflection illumination region on an emission pupil surface of the objective lens, in which an emission position of the light beam emitted from the light source is movable between an optical axis of the optical illumination system and a position shifting from the optical axis by a predetermined distance.

Advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and configure a part of the specification, illustrate embodiments of the invention, and together with the general description given above and the detailed description of the embodiments given below, serve to explain the principles of the invention.

FIG. 6 is a diagram showing a light flux refracted by the wedge prism for use in the second embodiment:

FIGS. 7A to 7D are explanatory views of a slit having a crescent opening for use in the second embodiment;

FIGS. 8A to 8E are explanatory views of a slit having a small-diameter opening for use in the second embodiment;

FIGS. 9A to 9D are explanatory views of a slit having an annular opening for use in the second embodiment;

FIGS. 10A and 10B are diagrams showing a schematic configuration of a main part of a modification of the second embodiment;

FIG. 12 is a diagram showing a light flux refracted by a conical prism for use in the third embodiment;

FIG. 13 is an explanatory view of a state of a light source image projected on the annular opening of the third embodiment;

FIGS. 19A and 19B are explanatory views of a slit having a crescent opening for use in the fifth embodiment;

FIGS. 20A and 20B are explanatory views of a slit having an annular opening for use in the fifth embodiment;

FIG. 21 is an explanatory view of a slit showing a small-diameter opening for use in the fifth embodiment;

FIG. 22 is an explanatory view of a state in which an afocal converter, wedge prism, and slit are detached from an optical path of an optical illumination system in the fifth embodiment;

FIG. 23 is a diagram showing a schematic configuration of a sixth embodiment of the present invention;

FIG. 24 is a diagram showing a schematic configuration of a seventh embodiment of the present invention; and FIG. 25 is a diagram showing a schematic configuration of an eighth embodiment of the present invention.

DETAILED DESCRIPTION OF THE INVENTION

Embodiments of the present invention will be described hereinafter with reference to the drawings.

First Embodiment

Figure 1:
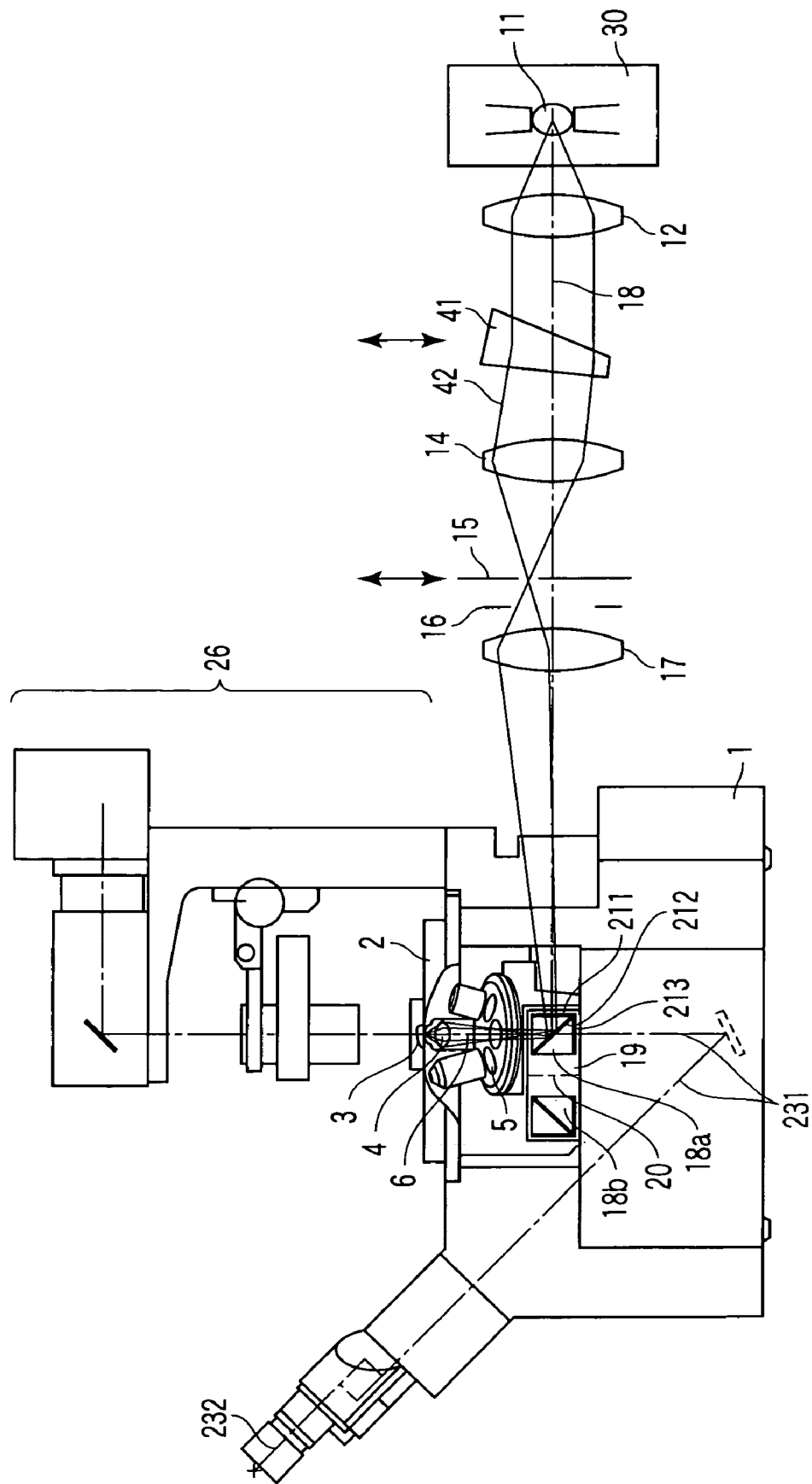
FIG. 1 is a diagram showing a schematic configuration of a first embodiment of the present invention.

FIG. 1 is a diagram showing a schematic configuration of a total reflection fluorescent microscope to which the present invention is applied. In this case, FIG. 1 shows an example of an inverted microscope for performing observation by an objective lens disposed below a specimen.

Figure 2:
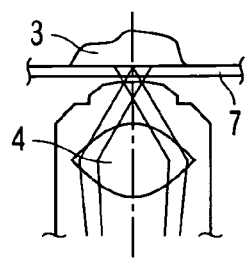
FIG. 2 is a diagram showing a schematic configuration of a main part of the first embodiment.

In FIG. 1, a stage 2 is disposed in an upper part of a microscope main body 1. A specimen 3 is laid on the stage 2. In this case, as shown in FIG. 2, a cover glass 7 is disposed under the specimen 3. An objective lens 4 is disposed under the cover glass 7 via oil (not shown).

A revolver 5 is disposed under the specimen 3. The revolver 5 is held in the microscope main body 1. The revolver 5 holds a plurality of objective lenses 4. When the revolver 5 rotates, it is possible to selectively dispose the objective lens 4 having a magnification or a type required for the observation on an observation optical axis 6. When the revolver 5 vertically moves along the observation optical axis 6 by an operation of a focusing handle (not shown) to change a relative distance between the specimen 3 and the objective lens 4 on the stage 2, the specimen 3 can be focused.

A light source 11 for illuminating the specimen 3 is used in total reflection fluorescent illumination or usual fluorescent illumination in which total reflection is not performed.

As the light source 11, high-luminance arc light sources such as a mercury lamp and xenon lamp are used. It is to be noted that these arc light sources preferably have micro luminescent spots, and the light source is selected having a luminescent spot in which a projected image on an emission pupil surface of the objective lens is smaller than an emission pupil diameter of the objective lens.

A collector lens 12 is provided on an illuminative light axis 18 of the optical path from the light source 11. The collector lens 12 condenses the light beams from the light source 11 and emits a parallel light beam.

A wedge-shaped plane plate 41 for decentering the optical path is disposed in the optical path of the parallel light beam from the collector lens 12. The wedge-shaped plane plate 41 refracts the parallel light beam emitted from the collector lens 12 at a predetermined angle with respect to the illuminative light axis 18.

A condenser 14 and a slit 15 are disposed in the optical path of a light flux refracted by the wedge-shaped plane plate 41. The condenser 14 condenses the light flux refracted by the wedge-shaped plane plate 41 on a surface of a slit 15, and a light source image 11a of the light source 11 is projected.

Figure 3A:
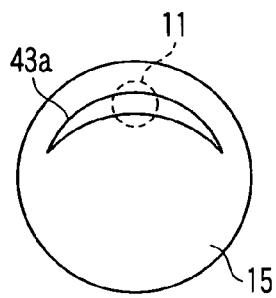
FIGS. 3A to 3C are explanatory views of a slit for use in the first embodiment.
Figure 3B:
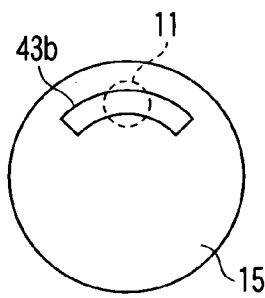
Figure 3C:
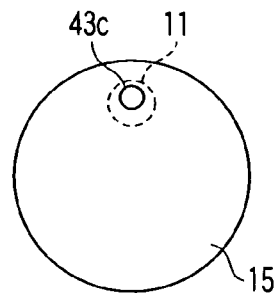

In the slit 15, slits having openings 43a, 43b, 43c having three different shapes shown in FIGS. 3A to 3C are used. These openings 43a, 43b, 43c transmit the light beams (light source images 11a) condensed by the condenser 14. The light beams transmitted through the openings 43a, 43b, 43c are to be totally reflected by a boundary surface between the specimen 3 and the cover glass 7.

It is to be noted that in any of three types of slits 15, two slits are disposed closely along an illuminative light axis 18. This is because the light beam that is not totally reflected, generated by frame reflection inside the illuminative light axis or by a diffracted light in the slit 15, is cut. The wedge-shaped plane plate 41 and slit 15 move along a plane vertical to the illuminative light axis 18 by known switching mechanism such as a slider, and are detachably inserted with respect to the optical path. When the wedge-shaped plane plate 41 and slit 15 are inserted into the optical path, the total reflection fluorescent illumination can be selected. When the wedge-shaped plane plate 41 and slit 15 are removed from the optical path, the usual fluorescent illumination that does not perform the total reflection can be selected. The slit 15 is movable along a plane crossing the illuminative light axis 18 at right angles (in a vertical direction of an arrow shown in FIG. 1 in this case) in a state in which the slit is inserted in the optical path.

A field stop (FS) 16 and an FS projection lens 17 are disposed in the optical path of the light transmitted through the slit 15. The field stop (FS) 16 is used to restrict an illumination field, and a slit diameter can be varied. The FS projection lens 17 projects the field stop (FS) 16 on three surfaces of the specimen 3, and projects the image of the slit 15 on an emission pupil surface of the objective lens 4.

A rotatable cassette 19 which holds two or more mirror units 18a, 18b is disposed on the optical path where the light beam is transmitted through the FS projection lens 17. The mirror units 18a, 18b are detachably fixed to the cassette 19 by known means such as a dovetail.

The cassette 19 is rotated around a rotation axis 20. By this rotation, the mirror units 18a, 18b are selectively switched on the observation optical axis 6 in accordance with wavelength characteristics of a fluorescent dyestuff with which the specimen 3 is dyed. In FIG. 1, the mirror unit 18a is switched (disposed) on the observation optical axis 6.

In the mirror unit 18a, an excitation filter 211, dichroic mirror 212, and absorption filter 213 are integrally disposed as a set. The excitation filter 211 selectively transmits a wavelength required for exciting the specimen 3 among the light beams emitted from the FS projection lens 17. The dichroic mirror 212 reflects an excitation wavelength from the excitation filter 211, and transmits a fluorescent wavelength emitted from the specimen 3. The dichroic mirror 212 is inclined by 45° with respect to both the illuminative light axis 18 and the observation optical axis 6 in such a manner that an excited light along the illuminative light axis 18 from the excitation filter 211 is guided in a direction matching the optical axis (observation optical axis 6). The absorption filter 213 selectively transmits only the wavelength required for the observation in fluorescence emitted from the specimen 3.

An optical relay system 231 is disposed in a transmission optical path of the absorption filter 213. An image of the specimen 3 formed by the objective lens 4 is relayed to the vicinity of an eyepiece lens 232. The eyepiece lens 232 is used in such a manner that the image of the specimen 3 relayed through the optical relay system 231 is visually observable.

Since the mirror unit 18b is configured in the same manner as in the mirror unit 18a, the description is omitted.

A transmission illumination section 26 includes an optical transmission illumination system in a case where transmission illumination observation is performed.

A case where the total reflection fluorescent illumination is performed in the above-described configuration will be described.

When an illuminative light beam is emitted from the light source 11, the light beam is formed into the parallel light beam by the collector lens 12 and is incident upon the wedge-shaped plane plate 41.

The wedge-shaped plane plate 41 refracts the parallel light beam from the collector lens 12 at a predetermined angle to emit a light flux (light source image) refracted with respect to the illuminative light axis 18. The light flux is condensed onto the slit 15 by the condenser 14.

In this case, in the slit 15, the crescent opening 43a (or the opening 43b or 43c) is formed linearly symmetrically with respect to a line passing through a center of the slit 15 on a slit 15 surface as shown in FIG. 3A. A circular portion of the opening 43a is formed substantially in parallel with a circumferential direction (i.e., on a substantially concentric circle).

Moreover, the light source image 11a is projected as the image of the light source 11 in the crescent opening 43a of the slit 15.

In the light source image 11a projected on the slit 15, the light beam transmitted through the opening 43a is incident upon the excitation filter 211 via the FS projection lens 17. The excitation filter 211 selects the light beam having a wavelength required for exciting the specimen 3. The light beam selected by its wavelength is reflected toward the objective lens 4 by the dichroic mirror 212, and subsequently projected onto the emission pupil of the objective lens 4. It is to be noted that the image of the slit 15 projected on the emission pupil surface of the objective lens 4, that is, a slit image will be described later.

All the light beams transmitted through the opening 43a of the slit 15 form totally reflected light beams within a total reflection region.

As shown in FIG. 2, the light beam transmitted through the emission pupil surface of the objective lens 4 passes through a peripheral edge portion of the objective lens 4, and reaches the cover glass 7 via the oil charged between the objective lens 4 and the cover glass 7. Here, the total reflection occurs in the boundary surface between the specimen 3 and the cover glass 7, and the evanescent light is generated in a range of about 50 to 200 nm on a specimen side of the boundary surface. The fluorescent dyestuff with which the specimen 3 is dyed by the evanescent light is excited to emit the fluorescence.

In this state, a surveyor moves the stage 2 to search for a desired observation range on the specimen 3, vertically moves the revolver 5 along the observation optical axis 6 by the operation of the focusing handle (not shown), and changes the relative distance between the specimen 3 and the objective lens 4 to focus the specimen 3.

The fluorescence emitted from the specimen 3 passes through the dichroic mirror 212, and the fluorescent wavelength required for the observation is selected by the absorption filter 213. Moreover, the image of the specimen 3 formed by the objective lens 4 is relayed to the eyepiece lens 232 via the optical relay system 231, and visual observation is possible.

To change the fluorescent wavelength to be observed of the fluorescent dyestuff dyed on the specimen 3, the cassette 19 is rotated around the rotation axis 20 and, for example, the mirror unit 18b may be switched on the observation optical axis 6 instead of the mirror unit 18a. To change the observation magnification of the specimen 3, the revolver 5 may be rotated to position the objective lens 4 having a desired magnification on the observation optical axis 6.

A relation between the slit image and the emission pupil surface of the objective lens 4 by the crescent opening 43a of the slit 15 will be described later.

In the above-mentioned description, the crescent opening 43a is formed in the slit 15, but the small-diameter opening 43b may also be formed in a predetermined position on the slit 15 plane, for example, as shown in FIG. 3B, the annular opening 43c may also be formed along the peripheral edge portion of the slit 15 surface as shown in FIG. 3C, or an elliptic opening (not shown) may also be formed. A relation between the slit image by the small-diameter opening 43b, the annular opening 43c, or the elliptic opening and the emission pupil surface of the objective lens 4 will be described later.

A case where the total reflection fluorescent observation is switched to usual fluorescent observation to perform the observation will be described.

Figure 4:
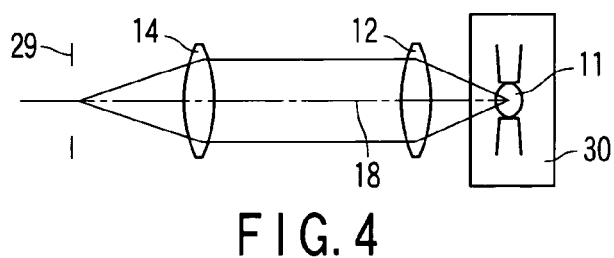
FIG. 4 is an explanatory view of a state in which a wedge prism and slit are removed from an optical path of an optical illumination system in the first embodiment.

In this case, as shown in FIG. 4, the wedge-shaped plane plate 41 and slit 15 are removed from the optical path of the optical illumination system, and an aperture stop (AS) 29 is inserted instead of the slit 15. Since the slit 15 is used for transmitting the illuminative light of the light source image through a total reflection region 27 of the objective lens 4, the slit 15 is removed from the optical path, and the aperture stop (AS) 29 is inserted as a diaphragm for adjusting brightness instead. The wedge-shaped plane plate 41 is used to project the light source image 11a in the periphery of the emission pupil of the objective lens 4. Especially, when the objective lens 4 has a high magnification, and the emission pupil diameter is small, the illuminative light is reflected by the objective lens 4, the region is darkened, and illumination unevenness sometimes occurs. Therefore, the wedge-shaped plane plate 41 is removed from the optical path.

From this state, visual sample observation is possible using a generally known usual fluorescent observation method.

As described above, since the wedge-shaped plane plate 41 is disposed as an optical device capable of projecting the light source image 11a on an optical path between the light source 11 and the slit 15, the optical axis of the optical path is decentered and moved, for example, to the opening 43a of the slit 15. Therefore, since the illuminative light can be efficiently taken into the total reflection region 27 of the objective lens 4 having an emission pupil diameter, the total reflection fluorescent observation by sufficient brightness can be realized. In the observation in the usual fluorescent illumination, when the wedge-shaped plane plate 41 and slit 15 are removed from the optical path, the light source image is projected on the optical axis. Therefore, also in this case, since the illuminative light can be efficiently taken in, the usual fluorescent observation by the sufficient brightness can be realized.

Moreover, the slit 15 for performing the total reflection illumination has the sector opening 43b for transmitting the light beam only in a part of the total reflection region. Therefore, even when the position or the size of the slit image changes by eccentricity of the optical illumination system or magnification error, the slit image can be prevented from deviating from the total reflection region of the emission pupil surface of the objective lens 4. Therefore, the slit image does not enter the fluorescent illumination region where the total reflection is not performed, the eccentricity error can be prevented, and the total reflection fluorescent observation can be realized with good contrast.

The opening 43a is formed in a crescent shape to enlarge an opening area of a portion which is not easily influenced by contrast deterioration with respect to the eccentricity. Conversely, an opening area of a portion easily influenced by the contrast deterioration with respect to the eccentricity can be reduced. Therefore, since the influence of the contrast deterioration by the eccentricity error of the optical system cannot be easily exerted, and additionally a middle portion of the opening 43a has a maximum necessary opening area, the illuminative light from the light source 11 can be efficiently taken. Therefore, the total reflection fluorescent observation can be realized with a sufficient brightness and with good contrast and balance.

The slit 15 having the small-diameter opening 43c is strong especially against the deterioration of the contrast by the eccentricity of the optical illumination system. When the slit is combined with the light source 11 having sufficient luminance, it is easy to apply the slit even to an optical system which does not have good accuracy. Since the slit 15 is easily worked, the slit is inexpensive. Furthermore, since the shape of the opening matches that of the luminescent spot of a general high-luminance arc light source, the illuminative light can be efficiently taken in, and the total reflection fluorescent observation by the sufficient brightness can be realized.

The annular and elliptic openings will be explained in the second embodiment.

Furthermore, the wedge-shaped plane plate 41 is disposed between the collector lens 12 which projects the light source 11 as the parallel light beam and the condenser 14 which condenses the parallel light beam to form the light source image 11a on the slit 15 plane, and each parallel light beam in a light flux 22 is refracted by the same angle by the wedge-shaped plane plate 41. Therefore, little aberration is caused by the wedge-shaped plane plate 41 or the condenser 14, and the satisfactory light source image 11a can be projected on the slit 15 plane. Accordingly, the illuminative light can be efficiently taken in, and bright total reflection fluorescent observation can be performed.

Second Embodiment

Next, a second embodiment of the present invention will be described.

Figure 5:
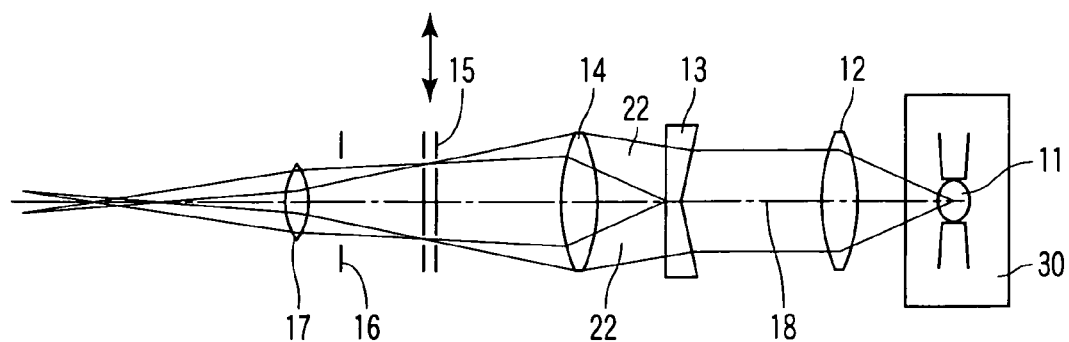
FIG. 5 is a diagram showing a schematic configuration of a main part of a second embodiment.

FIG. 5 is a diagram showing a schematic configuration of a main part of the second embodiment, and the same components as those of FIG. 1 are denoted with the same reference numerals.

In the second embodiment, a wedge prism 13 is disposed as an optical device for decentering the optical axis in the optical path of the parallel light beam from the collector lens 12. The wedge prism 13 refracts the parallel light beam emitted from the collector lens 12 in two directions including upward and downward directions as shown in FIG. 5, and emits the light flux 22 having a vertically linearly symmetric shape with respect to the illuminative light axis 18. FIG. 6 is a diagram concretely showing the light flux 22 refracted by the wedge prism 13 in two vertical directions. In this case, the light flux 22 refracted in two vertical directions by the wedge prism 13 is kept to be parallel.

The condenser 14 condenses the light flux 22 having two directions from the wedge prism 13 (parallel light beam inclined at a predetermined angle with respect to the illuminative light axis 18) on different places (two places of upper and lower places) on the slit 15 plane to project the image of the light source 11.

The slit 15 has three types of openings 23, 24, 25 having different shapes as described later in detail and as shown, for example, in FIGS. 7A, 8A, 9A in the same manner as in the first embodiment.

Since the configuration other than the above-described configuration is similar to that of the first embodiment, detailed description is omitted.

In this case, when the slit 15 is moved, the position of the slit image can be adjusted on the emission pupil surface of the objective lens 4. That is, when the slit image on the emission pupil surface is moved into a fluorescent illumination region 28 shown in FIG. 7B, usual fluorescent observation is possible. When the slit image is moved into the total reflection region 27, the total reflection fluorescent observation is possible. Furthermore, when the slit image is moved in the total reflection region 27, an incidence angle of the illuminative light upon the specimen from the objective lens can be finely adjusted, and an oozing depth of the evanescent light may also be controlled in accordance with an observation position of the specimen.

The similar effect and advantage can be obtained to the first embodiment even when the opening is formed at only either of upper or lower portion.

The wedge prism 13 refracts the parallel light beam from the collector lens 12 in two vertical directions as described above to emit the light flux 22 (light source image) having a vertically linearly symmetric shape with respect to the illuminative light axis 18. The light flux 22 is condensed onto two places of upper and lower places on the slit 15.

In this case, as the slit 15, it is preferable to use the slit in which crescent openings 23 are formed in two places of upper and lower places having point symmetry with respect to a center of the slit 15 on the slit 15 plane as shown in FIG. 7A.

Moreover, the light source images 11a are projected as the image of the light source 11 in the crescent openings 23 of the slit 15 as shown in FIG. 7C.

FIG. 7B shows the image of the slit 15 projected on the emission pupil surface of the objective lens 4, that is, a slit image 23a. In FIG. 7B, an orbicular portion shown by meshes in a pupil diameter 4a of the objective lens 4 shows the total reflection region 27 where the light is totally reflected by the boundary surface between the specimen 3 and the cover glass 7. A shown white circular portion inside the orbicular portion shows the fluorescent illumination region 28 where the total reflection is not performed.

Accordingly, all the light beams transmitted through the openings 23 of the slit 15 fall in the total reflection region 27 to form the totally reflected light beams. Since the subsequent operation is similar to that of the first embodiment, detailed description is omitted.

A relation between the slit image 23a by the crescent openings 23 of the slit 15 and the emission pupil surface of the objective lens 4 will be described in further detail with reference to FIG. 7B.

FIG. 7B shows a state in which the center of a slit image 23a by the crescent opening 23 deviates from that of a pupil diameter 4a of the objective lens 4. As causes for the deviation, a shift of an optical axis of the optical illumination system to the FS projection lens 17 from the light source 11, inclination error of a reflection surface in the dichroic mirror 212, mechanical eccentricity of the objective lens 4 and the like are considered.

In consideration of a case where the slit image 23a has the same size as that of the total reflection region 27, when the slit image 23a is eccentric even slightly, a part of the slit image 23a enters the fluorescent illumination region 28, light leak occurs, and accordingly a drop of contrast is sometimes caused. However, when the size of the slit image 23a is set to be smaller than that of the total reflection region 27, the slit image 23a constantly stays in the total reflection region 27 even with slight movement of the slit image 23a for the above-described causes. Therefore, there is not fear that the light beam enters the fluorescent illumination region 28 and leaks, and the observation with good contrast is possible. Therefore, the crescent opening 23 shown in FIG. 7A is formed in a smaller shape so as not to protrude on a fluorescent illumination region 28 side even when the slit image 23a slightly moves by magnification errors of the optical illumination system to the FS projection lens 17 from the light source 11 and the magnification error of the objective lens 4.

Moreover, when the cassette 19 is rotated to insert or remove the mirror units 18a, 18b having different wavelength characteristics on the observation optical axis 6, a positioning reproduction accuracy of a rotation direction of the cassette 19 sometimes results in the error of the inclination of the dichroic mirror 212 or the inclination error of the dichroic mirror 212 for each of the mirror units 18a, 18b. Moreover, these errors appear as positional shifts of projection of the slit image 23a in the objective lens emission pupil surface. In this case, when the slit image 23a is configured to change its direction in a left-to-right direction with respect to these errors in FIG. 7B, the slit image 23a by the crescent opening 23 long in the horizontal direction constantly stays in the total reflection region 27. Accordingly, the influence of deterioration of contrast can be eliminated with respect to vibration of the slit image 23a in the horizontal direction. Even when the position of the opening 23 of the slit 15 slightly shifts with respect to the light source image 11a shown in FIG. 7C, much light can be taken in from the light source 11, because the crescent openings 23 has a crescent shape long in the horizontal direction.

It is to be noted that the slit 15 in which the crescent openings 23 are formed has been described above in detail. However, the present invention is not limited to this. As described in the first embodiment, for example, a slit in which small-diameter openings 24 are formed in two positions of upper and lower positions having point symmetry with respect to the center of the slit 15 on the slit 15 plane as shown in FIG. 8A, a slit in which annular openings 25 are formed along the peripheral edge portion of the slit 15 plane as shown in FIG. 9A, a slit in which elliptic opening (not shown) are formed and the like are considered.

In the slit 15 having the small-diameter openings 24, as shown in FIG. 8C, the light source images 11a by the light source 11 are projected with respect to the openings 24. As shown in FIG. 8B, slit images 24a by the small-diameter openings 24 are projected on the emission pupil surface of the objective lens 4. In the slit 15 having the small-diameter openings 24, the light source images 11a sometimes shift from the small-diameter openings 24 and are darkened by deviation of the positions of the openings 24 and the light source images 11a by the above-described factors. However, if the light source images 11a greatly decentered, because the opening 24 is hardly extended to the fluorescent illumination area, the contrast can be prevented being degraded. Since the shape of the slit 15 is simple, the slit is characterized in that the slit is easily worked and is inexpensive.

In the slit 15 having the annular openings 25, as shown in FIG. 9C, the light source image 11a by the light source 11 is projected with respect to the openings 25. As shown in FIG. 9B, a slit image 25a by the openings 25 is projected on the emission pupil surface of the objective lens 4. When the slit image 25a shifts to the right/left in the slit 15 having the annular openings 25, an inner diameter of the slit image 25a easily overlaps with the fluorescent illumination region 28, and the contrast easily drops. However, even when the annular openings 25 and the light source image 11a slightly shift, a ratio at which the light source image 11a deviates from the openings 25 is small. Therefore, this is effective means for securing the brightness in a case where the eccentricity of the optical illumination system is small.

Since the shape of the opening can be matched with that of the luminescent spot of the general arc light source in the slit 15 having the elliptic openings shown in FIG. 8D and FIG. 8E, it is possible to efficiently take in the illuminative light.

Next, the present embodiment is similar to the first embodiment in a case where the total reflection fluorescent observation is changed to the usual fluorescent observation to perform the observation, and therefore the description is omitted.

As described above, according to the second embodiment, an effect similar to that of the first embodiment can be obtained.

It is to be noted that the size or shape of the light source 11 is not described in the first and second embodiments, but the size or shape of the light source 11 can be set as follows.

When the slit 15 has the crescent openings 23 shown in FIG. 7A or the annular openings 25 shown in FIG. 9A, a light source for obtaining an elliptic light source image 11b as shown in FIGS. 7D and 9D is used as the light source 11. Moreover, the elliptic light source image 11b is projected on each slit 15 in a state in which the longitudinal direction is positioned transversely as shown in FIGS. 7D and 9D. Then, since the light source image 11b is projected on a broad range of the opening 23 (25), an illumination efficiency can further be improved. To embody this, a whole lamp house 30 in which the light source 11 is stored may be configured so as to be rotatable around the illuminative light axis 18 in accordance with the lamp shape of the light source 11. At this time, the whole lamp house 30 may be rotatably supported, rotated by a predetermined angle in this state, and fixed via screws. Needless to say, instead of rotating the lamp house 30, the light source 11 itself may be rotated in the lamp house 30.

Modification of Second Embodiment

Next, a modification of the second embodiment will be described.

The modification of the second embodiment is an example in which the illumination efficiency is raised without using the wedge prism, and will be described with reference to FIGS. 10A and 10B.

As shown in FIG. 10A, the light source 11 is movable vertically in an arrow direction along the plane crossing the illuminative light axis 18 at right angles. Moreover, the light source 11 can be positioned in two positions including a position on the illuminative light axis 18 and a lower position deviating slightly from the illuminative light axis 18.

To perform the total reflection fluorescent observation, the light source 11 is set in a position denoted with reference numeral 11' slightly deviating from the illuminative light axis 18. Then, as shown in FIG. 10B, the light beams from the light source 11' are formed into the parallel light beam having a predetermined angle with respect to the illuminative light axis 18 by the collector lens 12, and are projected as a light source image 11a' in the opening 23 in the upper part of the slit 15. Accordingly, the illumination efficiency can be raised without using the wedge prism. To return to the usual fluorescent illumination, the light source 11 may be positioned on the illuminative light axis 18.

In the present modification, the light source 11 may be moved in the vertical direction of the light source 11 with one touch. However, the light source 11 usually has a centering function. Therefore, when the centering function is used, the illumination efficiency can be enhanced simply and inexpensively. It is to be noted that with the use of the wedge prism, less light is rejected by the collector lens 12 and condenser 14. Therefore, the illumination efficiency is better that that of the present modification, but brightness is to be enhanced inexpensively. In this case, the present modification is effective means.

Third Embodiment

Next, a third embodiment of the present invention will be described.

In the third embodiment, means for further reducing the illumination unevenness is added to the configuration of the second embodiment.

Figure 11:
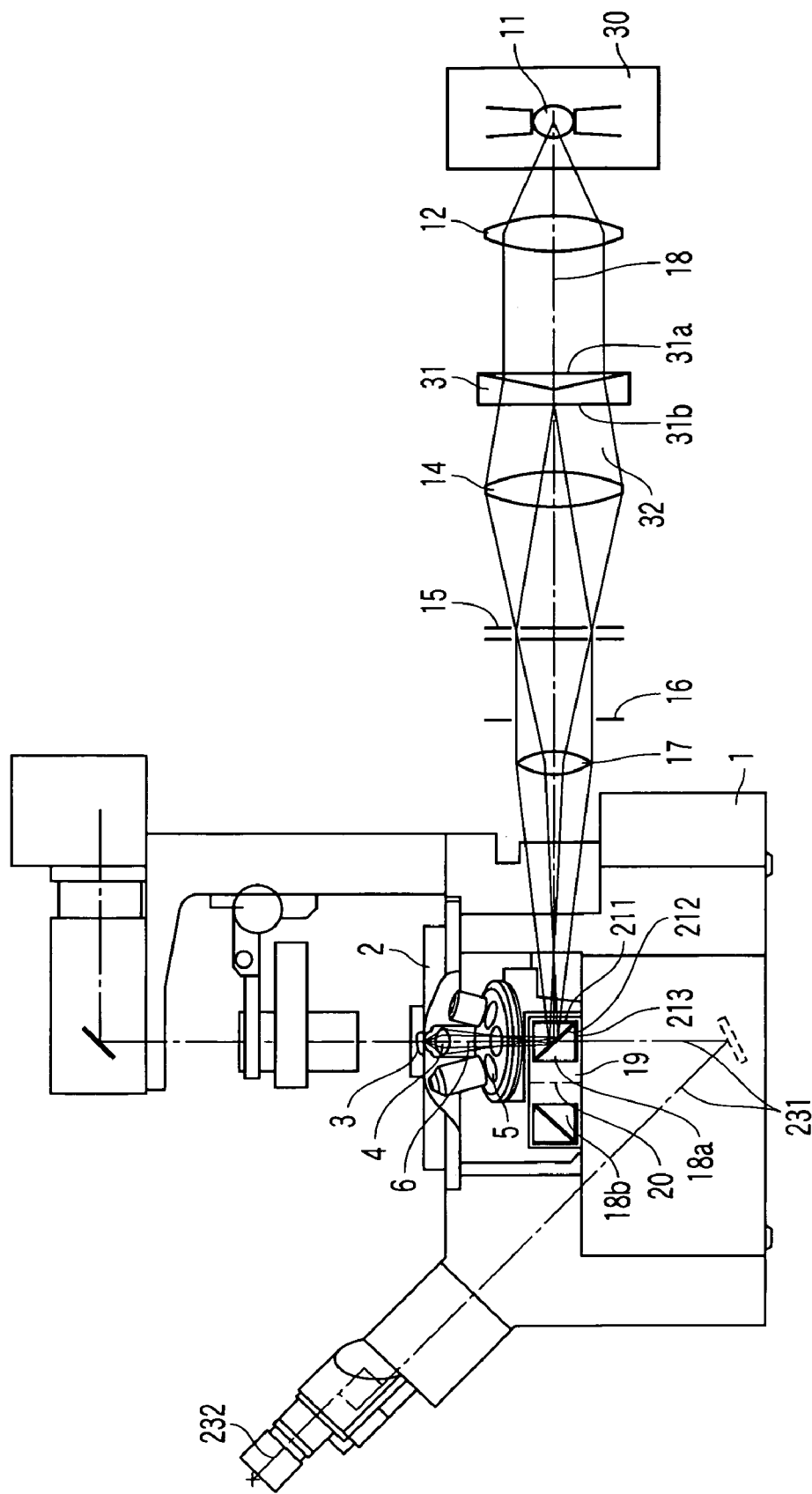
FIG. 11 is a diagram showing a schematic configuration of a third embodiment of the present invention.

FIG. 11 is a diagram showing a schematic configuration of the third embodiment.

In the third embodiment, a conical prism 31 is used instead of the wedge prism 13 described in the second embodiment. In the conical prism 31, a conical concave portion 31a is formed in the surface on a light source 11 side, and a surface on a specimen 3 side is formed in a flat surface 31b. Moreover, the conical prism 31 is disposed in such a manner that a vertex of the illuminative light axis 18 matches that of the conical concave portion 31a on the optical path of the parallel light beam from the collector lens 12.

The conical prism 31 refracts the parallel light beam from the collector lens 12 while keeping a parallel light flux toward the outside from the illuminative light axis 18 to emit a light flux 32. FIG. 12 is a diagram concretely showing the light flux 32 refracted toward the outside from the illuminative light axis 18 by the conical prism 31. Unlike the wedge prism 13, an inner diameter of the light flux 32 is conical.

The condenser 14 and slit 15 are disposed in the optical path of the light flux 32 reflected by the conical prism 31. As the slit 15, a slit is used in which the annular opening 25 is formed along the peripheral edge portion as shown in FIG. 13.

In the configuration, the parallel light beam emitted from the collector lens 12 is refracted toward the outside from the illuminative light axis 18 by the conical prism 31. The refracted parallel light beam is condensed in the annular opening 25 of the slit 15 by the condenser 14, and projected as the light source image 11a in the opening 25 of the slit 15. In this case, an infinite number of the light source images 11a projected on the annular opening 25 of the slit 15 are projected along a circumferential direction of the opening 25 around the illuminative light axis 18 as shown in FIG. 13.

Moreover, the light transmitted through the slit 15 is projected as a slit image on the emission pupil surface of the objective lens 4 via the FS projection lens 17. Accordingly, the total reflection fluorescent observation is possible in the same manner as in the second embodiment.

Thereafter, the light flux 32 refracted toward the outside from the illuminative light axis 18 is generated by the conical prism 31, and accordingly the light source image 11a can be projected along the annular opening 25 of the slit 15. Accordingly, in addition to the effect of the second embodiment, since the annular opening 25 can be uniformly illuminated, the illumination unevenness can be largely reduced.

Modification of Third Embodiment

Next, a modification of the third embodiment will be described

Figure 14B:
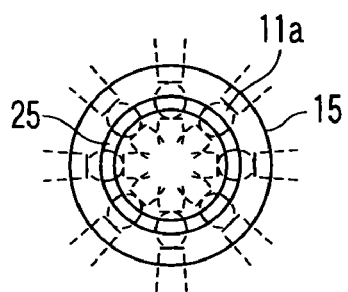
FIGS. 14A and 14B are diagrams showing a schematic configuration of a main part of a modification of the third embodiment.
Figure 14A:
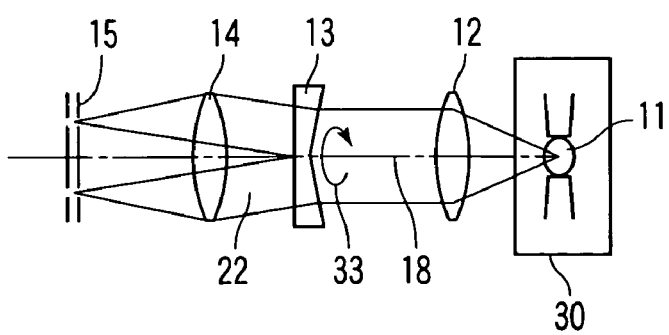

The modification of the third embodiment is an example including another means for reducing the illumination unevenness, and will be described with reference to FIGS. 14A and 14B.

In this case, the wedge prism 13 is disposed in the optical path between the collector lens 12 and the condenser 14 in the same manner as in the second embodiment. Moreover, a slit in which the annular opening 25 is formed along the peripheral edge portion as shown in FIG. 14B is used as the slit 15. Furthermore, in this state, the wedge prism 13 is rotated at a high speed in a direction of an arrow 33 using the illuminative light axis 18 which is a rotational center. In this case, the prism is rotated once at about 30 msec in the visual observation, or rotated at a rotation number higher than a scanning speed of photo-detection, when photo-detection means such as CCD. Accordingly, as shown in FIG. 14B, the light source image 11a rotates along the annular opening 25 around the illuminative light axis 18. Therefore, when a time average of the rotation is taken, an effect similar to that with the use of the conical prism 31 described in the third embodiment is obtained. In this case, the rotation means of the wedge prism 13 can be realized using a known motor and bearing.

Moreover, the light transmitted through the slit 15 is projected on the slit image on the emission pupil surface of the objective lens 4 via the FS projection lens 17. Accordingly, the total reflection fluorescent observation is possible in the same manner as in the second embodiment.

Therefore, when the wedge prism 13 is configured so as to be rotatable around the illuminative light axis 18 of the optical illumination system at a high speed, the light source image 11a can be projected along the annular opening 25, and therefore the total reflection fluorescent observation is realized with the illumination without any directionality or unevenness. The cost can also be reduced without using the expensive conical prism 31.

Fourth Embodiment

A fourth embodiment of the present invention will be described.

Figure 15:
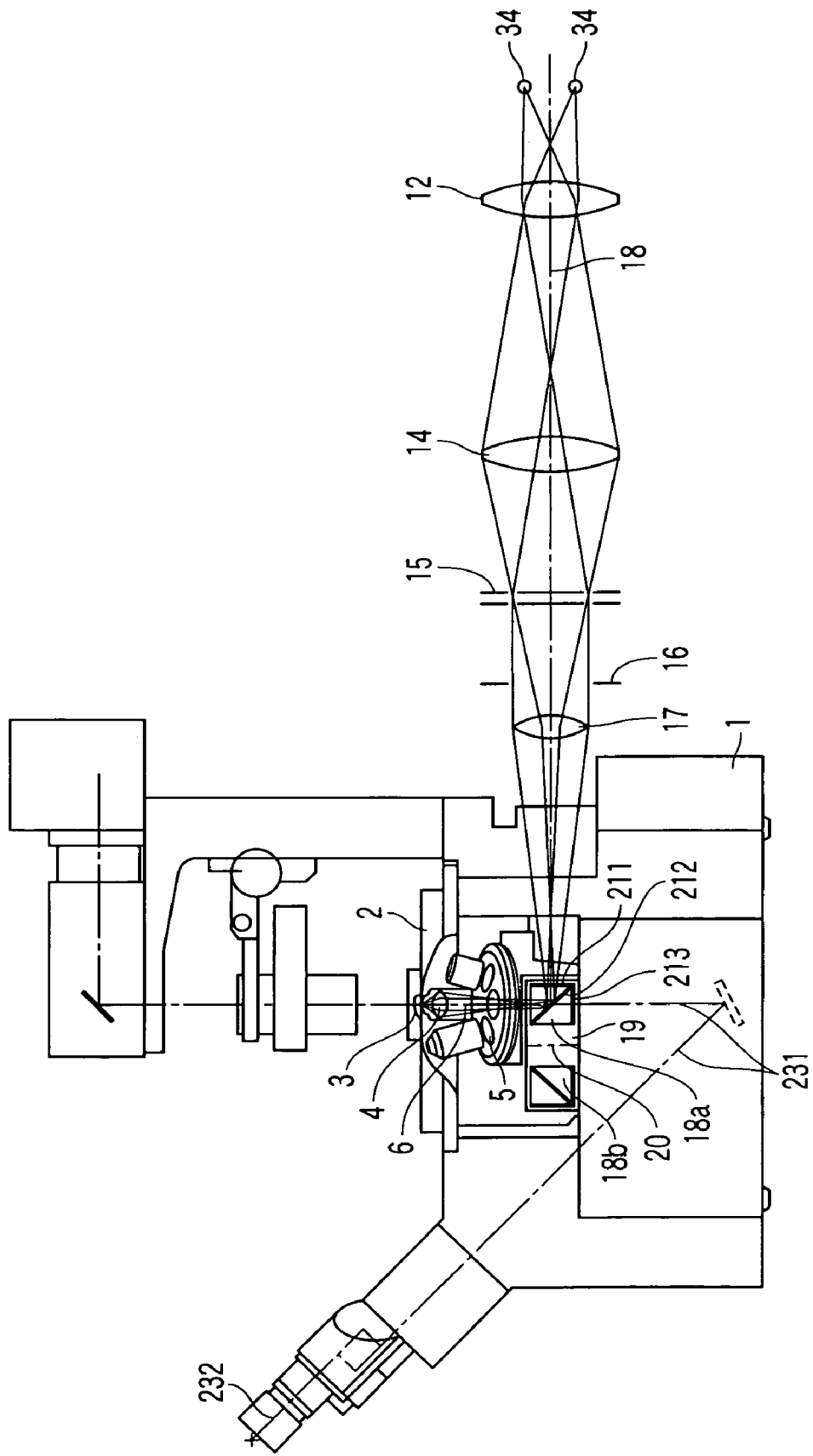
FIG. 15 is a diagram showing a schematic configuration of a fourth embodiment of the present invention.

FIG. 15 is a diagram showing a schematic configuration of the fourth embodiment, and the same components as those of FIG. 1 are denoted with the same reference numerals.

In the fourth embodiment, six LEDs 34 having micro luminescent spots are disposed instead of the light source 11. In this case, six LEDs 34 are disposed in the position of the point symmetry with respect to the illuminative light axis 18 on the plane crossing the illuminative light axis 18 at right angles. In the fourth embodiment, the wedge prism 13 is not required. As the slit 15, a slit is used in which the crescent openings 23 are formed in two positions of upper and lower positions of the point symmetry with respect to the center of the slit 15 on the slit 15 plane as shown in FIG. 16.

Figure 16:
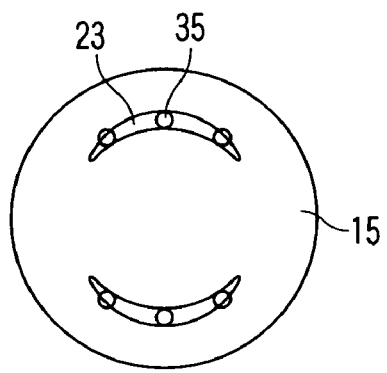
FIG. 16 is an explanatory view of an LED image projected on the crescent opening of the fourth embodiment.

In the above-described configuration, the illuminative lights emitted from six LEDs 34 are formed into parallel light beams having a predetermined angle with respect to the illuminative light axis 18 by the collector lens 12, and are projected as LED images 35 in the upper/lower crescent openings 23 of the slit 15 by the condenser 14 as shown in FIG. 16.

Moreover, the light transmitted through the slit 15 is projected as the slit image on the emission pupil surface of the objective lens 4 via the FS projection lens 17. Accordingly, the total reflection fluorescent observation is possible in the same manner as in the second embodiment.

Therefore, since the respective LED images 35 of six LEDs 34 can be projected on accordance with the upper/lower crescent openings 23 of the slit 15, the illumination efficiency can be further enhanced.

Figure 17:
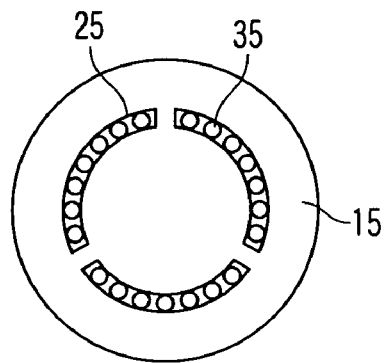
FIG. 17 is an explanatory view of a state of an LED image projected on the annular opening of the fourth embodiment.

It is to be noted that when the slit having the annular openings 25 as shown in FIG. 17 is used as the slit 15, a large number of LEDs 34 are arranged in an annular form around the illuminative light axis 18. Moreover, the lights from the LEDs 34 arranged in the annular form are projected as the LED images 35 in the annular openings 25 of the slit 15 via the collector lens 12 and condenser 14.

Since the LED images 35 from the annularly arranged LEDs 34 can be uniformly projected along the annular openings 25 of the slit 15 in this manner, the illumination unevenness can be reduced.

It is to be noted that when the number of LEDs 34 is further increased and a large number of LEDs are arranged around the illuminative light axis 18, the LEDs 34 can only be selectively lit in accordance with the shapes of the openings of the slit 15 to project the LED images 35 in accordance with various openings. All the LEDs 34 may be lit in the usual fluorescent illumination observation.

According to the fourth embodiment, by the use of the light source having a plurality of micro luminescent spots arranged to fill the openings 23 (25) of the slit 15, the light source image is projected only in a range passing through the openings 23 (25), and the illuminative light is not introduced except the total reflection region. Therefore, the illuminative light can be efficiently taken in, and the total reflection fluorescent observation is possible with the sufficient brightness and good contrast. Since the expensive wedge prism or conical prism is not used, the microscope is inexpensive. Especially, when a slit having the annular opening 25 is used as the slit 15, the total reflection fluorescent illumination having remarkably little unevenness may also be obtained.

Fifth Embodiment

A fifth embodiment of the present invention will be described.

Figure 18:
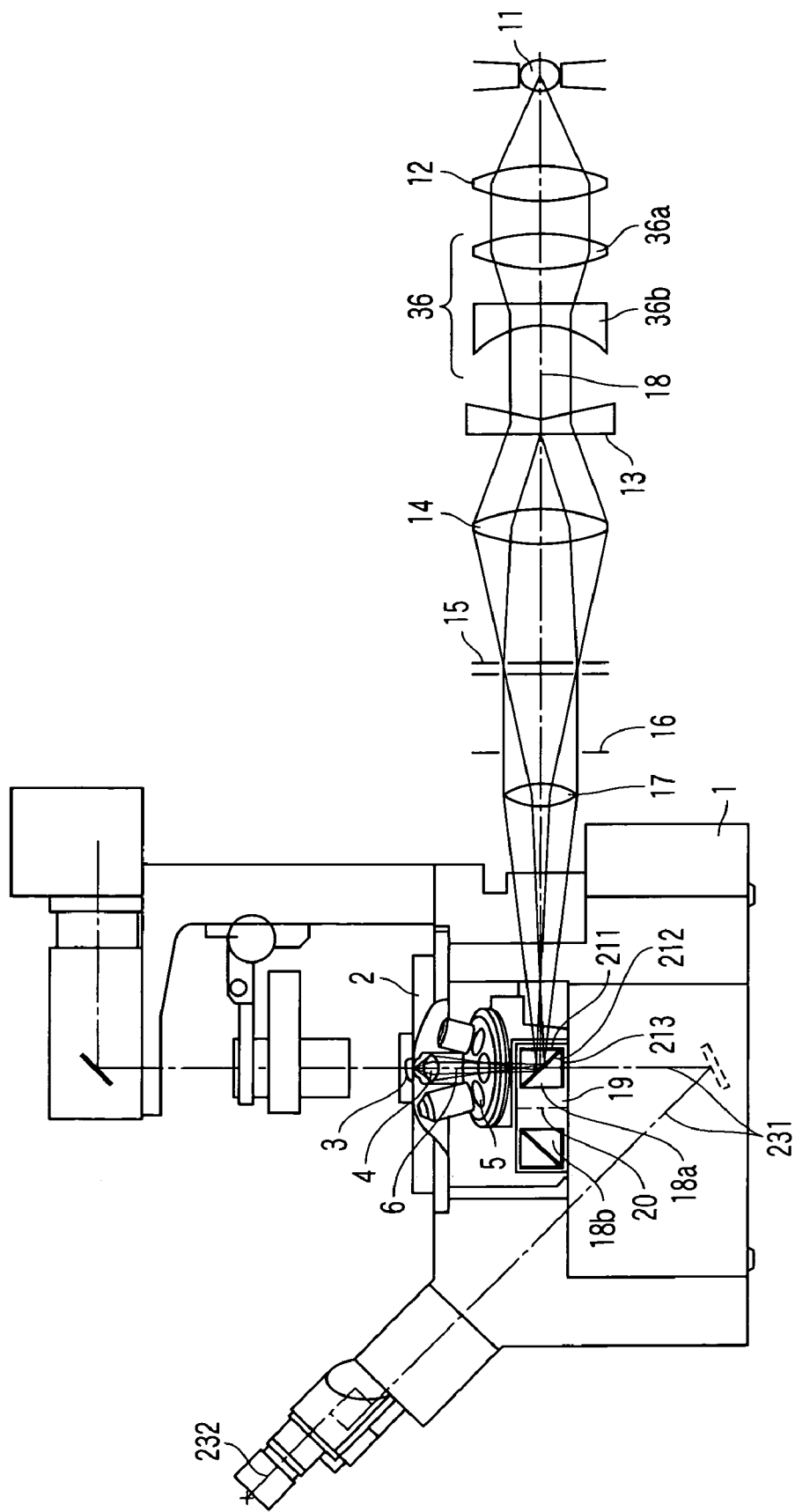
FIG. 18 is a diagram showing a schematic configuration of a fifth embodiment of the present invention.

FIG. 18 is a diagram showing a schematic configuration of the fifth embodiment, and the same components as those of FIG. 1 are denoted with the same reference numerals.

In the fifth embodiment, an afocal converter 36 is disposed as magnification varying means for raising light source magnification in the optical path between the collector lens 12 and the wedge prism 13. The afocal converter 36 comprises a convex lens 36a and concave lens 36b. By the afocal converter 36, the parallel light beam from the collector lens 12 is condensed onto the convex lens 36a, and diverted by the concave lens 36b. Accordingly, the parallel light beam whose light source magnification has been raised can be emitted. The afocal converter 36 is detachably inserted together with the wedge prism 13 and slit 15 with respect to the optical path.

In the slit 15, a slit in which the crescent openings 23 are formed in the two positions of upper and lower positions of the point symmetry with respect to the center of the slit 15 on the slit 15 plane as shown in FIGS. 19A and 19B, or a slit in which the annular openings 25 are formed along the peripheral edge portion of the slit 15 as shown in FIGS. 20 and 20B are used.

When the total reflection fluorescent illumination is performed, the illuminative light emitted from the light source 11 is projected as a light source image 37 on the slit 15 plane via the collector lens 12, the convex lens 36a and concave lens 36b configuring the afocal converter 36, the wedge prism 13, and the condenser 14. In this case, in the light source image 37, since the light source magnification is raised by the afocal converter 36, the light source image 37 projected on the slit 15 plane spreads sufficiently in a broad range on the respective openings 23, 25 as shown in FIG. 19B or 20B. FIG. 19A or 20A shows a case where the afocal converter 36 is not disposed, and the light source image 37 projected on the slit 15 plane overlaps with a part of the openings 23, 25.

Therefore, to perform the total reflection fluorescent illumination, when the convex lens 36a and concave lens 36b configuring the afocal converter 36 are inserted in the optical path to raise the magnification of the light source image 37, more openings 23 (25) of the slit 15 can be filled with the light source images 37, and therefore the illumination efficiency can be further enhanced.

The light transmitted through the slit 15 is projected as the slit image on the emission pupil surface of the objective lens 4 via the FS projection lens 17, and the total reflection fluorescent observation is possible in the same manner as in the second embodiment.

When the small-diameter openings 24 are formed in two positions of upper and lower positions of the point symmetry with respect to the center of the slit 15 in the slit 15 as shown in FIG. 21, even the light source images 37 projected onto the slit 15 plane sufficiently fill the openings 24 of the slit 15 in a state free of the afocal converter 36. Therefore, even when the light source magnification is raised particularly using the afocal converter 36, an effect of enhancement of the illumination efficiency is little.

Next, a case where usual fluorescent observation is performed will be described.

As shown in FIG. 22, the afocal converter 36, wedge prism 13, and slit 15 are removed from the optical path of the optical illumination system, and the aperture stop (AS) 29 is inserted instead of the slit 15. When the wedge prism 13 or the slit 15 enters the optical path, the illumination efficiency drops or the illumination unevenness increases in the same manner as in the second embodiment. Therefore, to perform the usual fluorescent observation, the prism or the slit is removed from the optical path, and the aperture stop (AS) 29 for adjusting the brightness is inserted instead of the slit 15. This can be realized by the use of an inserting/detaching mechanism such as a known slider. The convex lens 36a and concave lens 36b configuring the afocal converter 36 are effective for enhancing the illumination efficiency. However, on the contrary, the illumination field is narrowed, and an observable range is narrowed. Therefore, the afocal converter 36 is not required at the time of the usual fluorescent observation with the sufficient brightness, and is also removed from the optical path.

It is to be noted that the afocal converter 36 is used to changing the light source magnification. Therefore, even when the converter is removed from the optical path, a projection plane of the light source 11 is unchanged. Therefore, even when the aperture stop (AS) 29 is inserted in the optical path instead of the slit 15, the light source image is projected on the aperture stop (AS) 29 plane. Therefore, there is no fear that the illumination unevenness occurs also at the usual fluorescent observation time, the illumination efficiency does not drop, the illumination is bright, and therefore optimum microscopic inspection can be performed.

In this state, specimen can be visually observed by the generally known usual fluorescent observation method.

It is to be noted that another variable magnification lens is also usable as means for raising the light source magnification in addition to the afocal converter 36.

In the fifth embodiment, the afocal converter 36 is disposed as magnification varying means for raising a projection magnification of the light source 11 between the slit 15 and the light source 11. Accordingly, in the total reflection illumination, the magnification of the light source image is raised, and even a portion incapable of filling the openings 23 of the slit 15 is filled with the light source image 37. Accordingly, the total reflection fluorescent observation is possible by brighter illumination. Even when the afocal converter 36 is inserted or removed with respect to the optical path, the projection position of the light source image 37 in the optical-axis direction does not change. Therefore, the illumination efficiency at a total reflection fluorescent observation time does not drop. Moreover, the illumination unevenness does not easily occur at a usual fluorescent observation time, and optimum microscopic inspection can be performed in each observation.

Sixth Embodiment

A sixth embodiment of the present invention will be described.

FIG. 23 is a diagram showing a schematic configuration of a main part of a sixth embodiment, and the same components as those of FIG. 1 are denoted with the same reference numerals.

In this case, the collector lens 12, condenser 14, and slit 15 are disposed on the illuminative light axis 18 of the light from the light source 11. A convex lens 44 having a large diameter is disposed as a lens having a weak refractive power between the collector lens 12 and the condenser 14.

The convex lens 44 is disposed while a central axis 44a is largely shifted from the illuminative light axis 18, and the parallel light beam from the collector lens 12 is refracted by a predetermined angle with respect to the illuminative light axis 18. The condenser 14 condenses a light flux 45 refracted by the convex lens 44 is condensed on the slit 15 plane, and the light source image 11a is projected. Also in this case, a slit is used in which a crescent opening 43 is formed on the slit plane is used in the same manner as in FIG. 3A. The light source image 11a is projected on the crescent opening 43a via the condenser 14.

Also in the sixth embodiment, the convex lens 44 and slit 15 can be detachably inserted with respect to the optical path of the illuminative light by known switching mechanisms such as a slider. The slit 15 inserted in the optical path is movable further along the plane crossing the illuminative light axis 18 at right angles in a known arrow direction.

The other configuration is similar to that of FIG. 1.

Therefore, the effect similar to that of the first embodiment can be expected.

Seventh Embodiment

A seventh embodiment of the present invention will be described.

FIG. 24 is a diagram showing a schematic configuration of a main part of the seventh embodiment, and the same components as those of FIG. 1 are denoted with the same reference numerals.

In FIG. 24, the collector lens 12, condenser 14, and slit 15 are disposed on the illuminative light axis 18 of the light from the light source 11. A parallel plane plate 46 is disposed between the condenser 14 and the slit 15.

The parallel plane plate 46 is inclined at a predetermined angle with respect to the illuminative light axis 18 and disposed to move the light beam from the condenser 14 in parallel with the illuminative light axis 18, and condenses the light on the slit 15 plane to project the light source image 11a. Also in this case, a slit in which the crescent opening 43 is formed on the slit plane is used as the slit 15 in the same manner as in FIG. 22. The light source image 11a is projected on the crescent opening 43 via the condenser 14.

Also in this case, the parallel plane plate 46 and slit 15 are detachably inserted with respect to the optical path of the illuminative light by known switching mechanisms such as the slider. Moreover, the inclination angle of the parallel plane plate 46 inserted in the optical path is adjustable in the arrow direction. Therefore, even when the total reflection region differs with the type of the objective lens, the inclination angle of the parallel-plane plate 46 can be adjusted to adjust the light source image 11a in an optimum position in the total reflection region. Furthermore, even the slit 15 inserted in the optical path can move along the plane crossing the illuminative light axis 18 at right angles in the arrow direction.

The other configuration is similar to that of FIG. 1.

Therefore, the effect similar to that of the first embodiment can be expected.

Eighth Embodiment

An eighth embodiment of the present invention will be described.

FIG. 25 is a diagram showing a schematic configuration of a main part of the eighth embodiment, and the same components as those of FIG. 1 are denoted with the same reference numerals.

In FIG. 25, the collector lens 12, condenser 14, and slit 15 are disposed on the illuminative light axis 18 of the light from the light source 11. Mirrors 47, 48 are disposed between the condenser 14 and the slit 15.

The light beam from the condenser 14 is reflected by the mirror 47, and the reflected light is reflected by the mirror 48. Accordingly, the optical path of the optical illumination system is moved in parallel, that is, the light beam from the condenser 14 is moved in parallel with the illuminative light axis 18 and condensed onto the slit 15 plane to project the light source image 11a. Even in the eighth embodiment, the slit in which the crescent opening 43 is formed on the slit plane as described with reference to FIG. 22 is used as the slit 15. The light source image 11a is projected on the crescent opening 43 via the condenser 14.

Even in this case, the mirrors 47, 48 and the slit 15 can be detachably inserted with respect to the optical path of the illuminative light by the known switching mechanisms such as the slider. In the mirrors 47, 48, the mirror 48 is movable in the arrow direction, and the distance from the mirror 47 can be adjusted. Accordingly, even when the total reflection region differs with the type of the objective lens, the distance between the mirrors 47, 48 can be adjusted so as to adjust the light source image 11a in an optimum position in the total reflection region. Furthermore, even the slit 15 inserted in the optical path can move along the plane crossing the illuminative light axis 18 at right angles in the arrow direction.

The other configuration is similar to that of FIG. 1.

Therefore, the effect similar to that of the first embodiment can be expected.

The present invention is not limited to the above-described embodiments, and can be variously modified in a range in which the scope is not changed. For example, in the embodiments, the optical device for decentering the optical axis has been described. Alternatively, a plurality of optical devices having different eccentricities of the optical axis are prepared, and may also be selectively used in accordance with the type of the objective lens (the total reflection region differs). The plane of the slit 15 on the light source 11 side may also be formed in a reflection plane or an irregular reflection plane. In this case, degradation by heat or the like in a portion which interrupts the light beam of the slit 15, that is, a portion irradiated with the light beam can be reduced. Furthermore, in the embodiments, the inverted microscope has been described by which the observation is performed by the objective lens disposed under the specimen, but a transmission illumination type may also be used in which the total reflection fluorescent illumination is performed using a condenser lens, or an erected microscope may also be used.

Furthermore, the embodiments include various stages of inventions, and various inventions can be extracted by an appropriate combination of a plurality of configuring elements. For example, even when several configuring elements are removed from all the configuring elements described in the embodiments, the described problems to be solved by the present invention can be resolved, and the described effects of the present invention are obtained. In this case, the configuration from which the configuring elements are removed can be extracted as the invention.

It is to be noted that the above-described embodiments also include the following inventions.

A fluorescence microscope according to a first aspect of the present invention is characterized by comprising a light source; an optical illumination system which forms an optical path to irradiate a specimen with a light beam from the light source; an objective lens which condenses the light beam of the optical illumination system onto the specimen; an optical device which is disposed on the optical path of the optical illumination system and which decenters the light beam by decentering an optical axis of the optical path; and a slit which passes the light beam decentered by the optical device through a total reflection illumination region on an emission pupil surface of the objective lens. In the first aspect, the following manners are preferable.

(1) The total reflection illumination is illumination using an evanescent light oozing by a predetermined amount on a specimen side in a boundary surface between glass on which the specimen is laid and the specimen.

(2) The optical device and the slit are movable along a plane vertical to the optical axis of the optical path of the optical illumination system.

(3) The opening has at least one of a crescent shape, a circular shape, a half-ring shape, and an elliptic shape.

(4) The optical device is a prism.

(5) In (4), the prism is either a wedge prism or a conical prism.

(6) In (4), the prism is a wedge-shaped plane plate.

(7) The optical device is a lens having a small refractive index.

(8) The optical device is a parallel plane plate disposed with a predetermined angle with respect to the optical axis.

(9) The optical device comprises a pair of mirrors which move the optical path of the optical illumination system.

(10) The optical device includes a plurality of optical devices, and the plurality of optical devices are selectively inserted in the optical path of the optical illumination system.

(11) In (5) or (6), the wedge prism is rotatable around the optical axis of the optical illumination system.

(12) The light source has a luminescent spot in which a projected image on an emission pupil surface of the objective lens is smaller than an emission pupil diameter of the objective lens.

(13) In (12), the light source is either a micro arc type light source or a light source comprising a plurality of micro luminescent spots.

(14) In (13), the light source comprising the plurality of micro luminescent spots includes a plurality of light emitting diodes.

(15) In (14), the plurality of light emitting diodes are arranged on a circumference having a predetermined diameter.

(16) An optical magnification varying system which is disposed in the optical path of the optical device on the light source side to raise a projection magnification of the light source is further provided.

(17) In (16), the optical magnification varying system includes an afocal converter.

(18) The slit has a reflection surface or an irregular reflection surface formed on a plane on a light source side.

A fluorescence microscope according to a second aspect of the present invention is characterized by comprising: a light source; an optical illumination system which forms an optical path to irradiate a specimen with a light beam from the light source; an objective lens which condenses the light beam of the optical illumination system onto the specimen; and a slit which passes the light beam from the light source through a total reflection illumination region on an emission pupil surface of the objective lens, in which an emission position of the light beam emitted from the light source is movable between an optical axis of the optical illumination system and a position shifting from the optical axis by a predetermined distance.

According to the embodiments of the present invention, the optical device for decentering the optical axis of the optical path is disposed between the light source and the slit. Accordingly, the illuminative light can be efficiently taken in the total reflection region having an emission pupil diameter of the objective lens by the eccentricity of the optical axis of the optical path.

Moreover, the optical device and slit are detachably inserted in the optical path. Therefore, when the states are only selected, the illuminative light can be efficiently taken into the total reflection region of the emission pupil surface of the objective lens or the fluorescent illumination region where the total reflection is not performed.

Furthermore, the slit for performing the total reflection illumination has the crescent opening which passes the light beam only through a part of the total reflection region. Accordingly, even when the position or the size of the slit image changes by the eccentricity or the magnification error of the optical illumination system, the slit image can be prevented from deviating from the total reflection region of the emission pupil surface of the objective lens.

Moreover, since the wedge prism or the conical prism is used as the optical device, the respective parallel light beams in the light flux can be refracted by an equal angle, little aberration is generated by the prism or the condenser, and a satisfactory light source image can be projected on the slit plane.

Furthermore, since a light source having a plurality of micro luminescent spots is used as the light source, the light source image is projected only in a range passing through the slit. Since the illuminative light is not introduced into a region other than the total reflection region, the illuminative light can be efficiently taken.

Moreover, since the wedge prism is rotatable around the optical axis of the optical illumination system, the light source image can be projected on the annular shape, and the illumination is obtained without any directionality or unevenness.

Furthermore, since an optical magnification varying system for changing a projection magnification is disposed in the optical path of the optical device on the light source side, in the total reflection illumination, the magnification of the light source image is raised, and even the portion of the slit that cannot be filled is filled with the light source image, and the total reflection fluorescent observation by brighter illumination is possible.

As described above, according to the embodiments of the present invention, there can be provided a total reflection fluorescent microscope in which use efficiency of the illuminative light is raised, and the total reflection fluorescent observation is possible with the sufficient brightness and good contrast.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A fluorescent microscope comprising:
a light source;
an optical illumination system which forms an optical path to irradiate a specimen with a light beam from the light source;
an objective lens which condenses the light beam of the optical illumination system onto the specimen;
an optical device which is disposed on the optical path of the optical illumination system and which decenters an optical axis of the optical path so as to decenter the light beam;
a condensing lens which condenses the decentered light beam to form an image of the light source; and
a slit which has at least one opening in a vicinity of the image of the light source and which passes the light beam that has passed through the opening to a total reflection illumination region on an emission pupil surface of the objective lens.

2. The fluorescent microscope according to claim 1, wherein the total reflection illumination region is illuminated using an evanescent light seeping by a predetermined amount on a specimen side in a boundary surface between glass on which the specimen is laid and the specimen.

3. The fluorescent microscope according to claim 1, wherein each of the optical device and the slit is movable along a plane perpendicular to the optical axis of the optical path of the optical illumination system.

4. The fluorescent microscope according to claim 1, wherein the opening of the slit is wider in a central portion thereof than at longitudinal ends thereof.

5. The fluorescent microscope according to claim 4, wherein the opening has at least one of a crescent shape and an elliptic shape.

6. The fluorescent microscope according to claim 1, wherein the optical device comprises a wedge prism.

7. The fluorescent microscope according to claim 6, wherein the wedge prism is rotatable around the optical axis of the optical illumination system.

8. The fluorescent microscope according to claim 1, wherein the optical device comprises a wedge-shaped plane plate.

9. The fluorescent microscope according to claim 1, wherein the light source has a luminescent spot in which a projected image on the emission pupil surface of the objective lens is smaller than an emission pupil diameter of the objective lens.

10. The fluorescent microscope according to claim 1, wherein the light source comprises one of a micro arc type light source and a light source comprising a plurality of micro luminescent spots.

11. The fluorescent microscope according to claim 10, wherein the light source comprising the plurality of micro luminescent spots includes a plurality of light emitting diodes.

12. The fluorescent microscope according to claim 11, wherein the plurality of light emitting diodes are arranged on a circumference having a predetermined diameter.

13. The fluorescent microscope according to claim 1, further comprising:
an optical magnification varying system which is attachably/detachably disposed in the optical path of the optical illumination system at a light source side of the optical illumination system to raise a projection magnification of the light source.

14. The fluorescent microscope according to claim 13, wherein the optical magnification varying system includes an afocal converter.

15. The fluorescent microscope according to claim 1, wherein the slit comprises one of a reflection surface and an irregular reflection surface formed on a plane on a light source side thereof.

* * * * *